US012769080B2

(12) United States Patent
Yamana

(10) Patent No.: US 12,769,080 B2
(45) Date of Patent: Oct. 20, 2026

(54) IMAGING APPARATUS

(71) Applicant: CANON KABUSHIKI KAISHA, Tokyo (JP)

(72) Inventor: Kazuaki Yamana, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 287 days.

(21) Appl. No.: 18/763,125

(22) Filed: Jul. 3, 2024

(65) Prior Publication Data

US 2025/0035878 A1 Jan. 30, 2025

(30) Foreign Application Priority Data

Jul. 25, 2023 (JP) ................................ 2023-120478

(51) Int. Cl.
*G02B 7/00* (2021.01)
*G02B 27/00* (2006.01)
*G03B 17/12* (2021.01)

(52) U.S. Cl.
CPC ......... *G02B 7/006* (2013.01); *G02B 27/0006* (2013.01); *G03B 17/12* (2013.01)

(58) Field of Classification Search
CPC .... G02B 7/006; G02B 27/0006; G03B 17/12; G03B 11/00
USPC ........................................ 359/642, 722, 723
See application file for complete search history.

(56) References Cited

U.S. PATENT DOCUMENTS 11,754,911 B2 * 9/2023 Abe ....................... G03B 17/12 348/374

FOREIGN PATENT DOCUMENTS

JP 2010226526 A 10/2010

* cited by examiner

*Primary Examiner* — Tuyen Tra
(74) *Attorney, Agent, or Firm* — Cowan, Liebowitz & Latman, P.C.

(57) ABSTRACT

An imaging apparatus includes an optical filter, a holding member which holds the optical filter and which is movable between a first position where an imaging luminous flux passes through the optical filter and a second position where the imaging luminous flux does not pass through the optical filter, and an elastic member which relatively moves on a surface of the optical filter while being in contact with the surface during a movement of the holding member. A portion, on a surface of the holding member, where the elastic member comes into contact with when the holding portion is at the first position or the second position is rougher than the surface of the optical filter.

8 Claims, 9 Drawing Sheets

100

100

IMAGING APPARATUS

BACKGROUND OF THE INVENTION

Field of the Invention

The present invention relates to an imaging apparatus such as a digital camera with a built-in optical filter.

Description of the Related Art

Recently, with improvements in moving image photography functions in digital cameras, more and more users are performing moving image photography using digital cameras with interchangeable lenses such as a mirrorless interchangeable lens camera. In addition, digital cameras capable of representing moving images by utilizing blurring and a wide dynamic range due to a combination of lenses and large-format sensors are being used. In photography in a bright environment such as outdoors in the daytime, image quality deterioration called blown-out highlights occurs when brightness exceeds an upper limit value of the dynamic range of the sensor and causes a loss in image information. While the image quality deterioration can be reduced by adjusting sensitivity of the sensor, there are cases where sensitivity cannot be sufficiently adjusted. In consideration thereof, generally, photography is performed by reducing a light amount of an imaging luminous flux that is incident to the sensor.

While methods of reducing a light amount of incident light of a sensor include reducing a lens diaphragm, since this method also increases depth of field, blurring expressions utilizing lens performance become difficult. In addition, the light amount of incident light of a sensor can also be reduced by increasing shutter speed. However, when imaging a subject moving at high speed, since increasing the shutter speed results in consecutive still images with little subject blur in each frame, a video (moving image) with flickers due to loss of smoothness may be obtained.

In consideration thereof, an ND (Neutral Density) filter (also referred to as a dark filter) is often used in moving image photography. The ND filter is a physical optical filter which reduces a light amount without significantly affecting color development in a captured image and is capable of increasing a degree of freedom by which a shutter speed or an aperture value can be changed and expanding a width of expression of moving image photography even in a bright imaging environment.

In addition, a camera with a built-in ND filter configured in such a manner that the ND filter is capable of advancing and retreating with respect to a sensor has been proposed. However, dust or the like inside of the camera may adhere to the ND filter when the ND filter moves inside of the camera.

In consideration thereof, as shown in FIG. 9, a configuration in which a foreign object adhered to an ND filter built into a camera is removed by a cleaning plate is proposed (Japanese Patent Application Laid-open No. 2010-226526). FIG. 9 is a schematic configuration diagram of a foreign object removal apparatus 900 that is built into the camera according to Japanese Patent Application Laid-open No. 2010-226526. The foreign object removal apparatus 900 includes an ND filter 901, a cleaning plate 902, a holding portion 903, a guide 904, a lead screw 905, adhesive members 906 and 907, and a motor 908.

One end of the cleaning plate 902 is connected to the holding portion 903 so as to come into contact with a surface of the ND filter 901 and another end of the cleaning plate 902 is engaged with the guide 904. The holding portion 903 is engaged with the lead screw 905 and moves along the lead screw 905 as the lead screw 905 is rotated by a rotation of the motor 908. In addition, the adhesive members 906 and 907 are arranged at positions sandwiching the ND filter 901 so as to be capable of coming into contact with the cleaning plate 902. The cleaning plate 902 moves on the ND filter 901 and the adhesive members 906 and 907 with the movement of the holding portion 903.

A foreign object that adheres to the surface of the ND filter 901 is first captured by the cleaning plate 902 and then captured by the adhesive members 906 and 907 when the cleaning plate 902 moves onto the adhesive members 906 and 907.

However, with the foreign object removal apparatus according to Japanese Patent Application Laid-open No. 2010-226526, depending on adhesion of the adhesive members, a foreign object having been captured by the cleaning plate 902 may avoid being captured by the adhesive members and may return to the ND filter. In addition, increasing adhesion of the adhesive members 906 and 907 may prevent the cleaning plate 902 from moving smoothly and may end up damaging the cleaning plate 902.

SUMMARY OF THE INVENTION

The present invention provides a technique for more suitably removing, in an imaging apparatus with a built-in optical filter, a foreign object adhered to the optical filter.

According to some embodiments, an imaging apparatus includes an optical filter, a holding member which holds the optical filter and which is movable between a first position where an imaging luminous flux passes through the optical filter and a second position where the imaging luminous flux does not pass through the optical filter, and an elastic member which relatively moves on a surface of the optical filter while being in contact with the surface during a movement of the holding member, wherein a portion, on a surface of the holding member, where the elastic member comes into contact with when the holding portion is at the first position or the second position is rougher than the surface of the optical filter.

Further features of the present invention will become apparent from the following description of exemplary embodiments with reference to the attached drawings.

DESCRIPTION OF THE EMBODIMENTS

Hereinafter, embodiments of the present invention will be described in detail with reference to the drawings. However, it is to be understood that constituent elements described in the following embodiments are merely exemplary and that the technical scope of the present invention is not intended to be limited by any of the individual embodiments described below but to be defined by the scope of claims. In addition, configurations may be created by appropriately combining parts of the embodiments described below with each other.

Figure 1A:
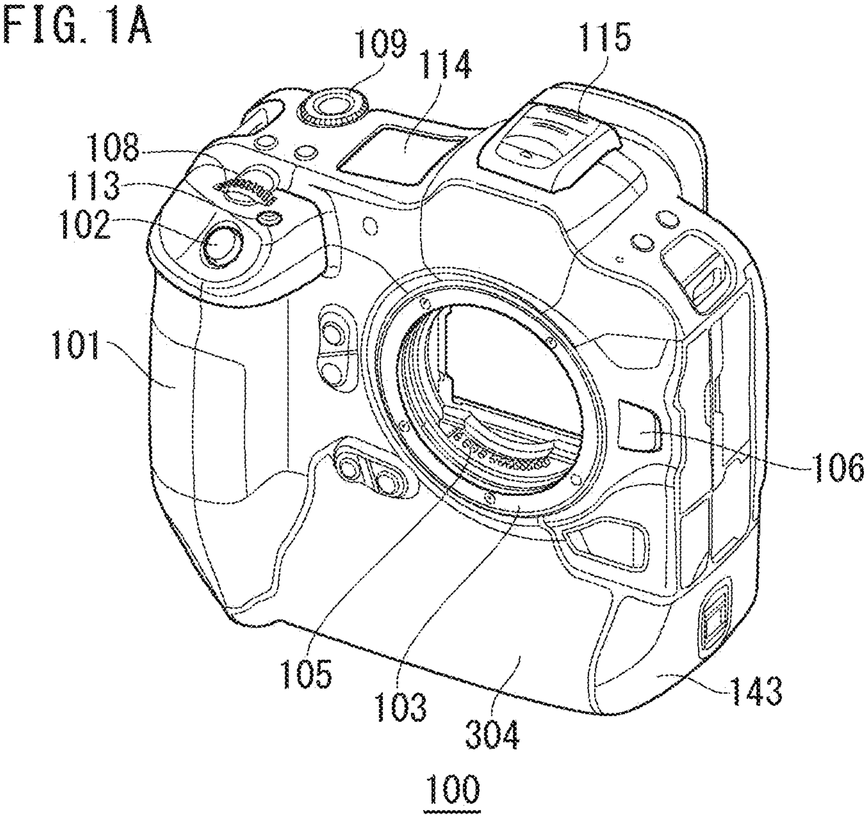
FIGS. 1A and 1B are external perspective views of an imaging apparatus according to an embodiment.
Figure 1B:
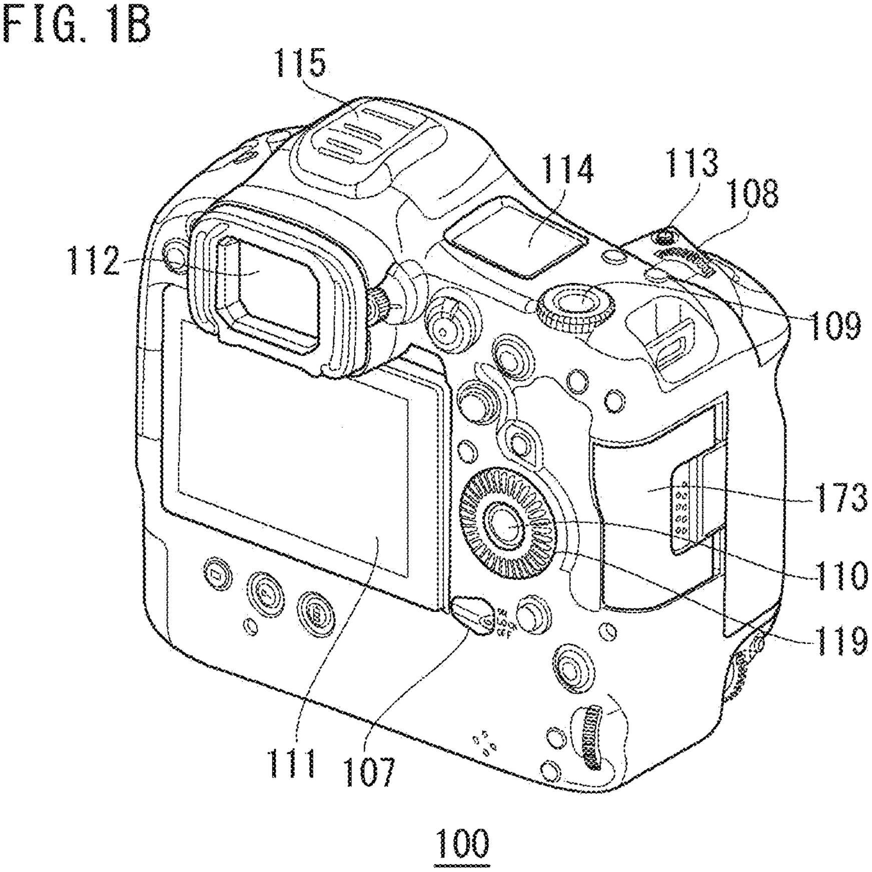

A configuration of a camera that is an example of an imaging apparatus according to the present embodiment will be described with reference to FIGS. 1A and 1B. FIGS. 1A and 1B are external perspective views of a camera 100 according to the present embodiment. FIG. 1A is a perspective view of the camera 100 as seen from a side (front side) where an imaging luminous flux is incident and FIG. 1B is a perspective view of the camera 100 as seen from an opposite side (rear side) to the side where the imaging luminous flux is incident. Note that FIGS. 1A and 1B show a state where a photographic lens unit 104 (FIG. 2) to be mounted to the camera 100 has been removed.

In FIG. 1A, the camera 100 includes a grip portion 101 for a user to stably hold the camera 100. A shutter button 102 that is a switch used to start imaging is provided in an upper part of the grip portion 101. In addition, the camera 100 includes a grip portion 304 for gripping the camera in a different direction from the grip portion 101. As shown in FIG. 1A, a lens mount portion 103 is provided on a front surface of the camera 100 and enables the photographic lens unit 104 shown in FIG. 2 to be attached to and detached from the camera 100.

In addition, a mount contact point 105 between the camera 100 and the photographic lens unit 104 electrically connects the camera 100 and the photographic lens unit 104 to each other, supplies power to the photographic lens unit 104, and performs communication related to lens control and lens data using electric signals. When replacing a lens, a lens lock release button 106 is depressed to release engagement of the lens and enable the lens to be detached.

A power supply switch 107 is used when turning power of the camera on or off. In addition, the power supply switch 107 is also used when prohibiting an operation with respect to a specific operation member. A main electronic dial 108 and a sub electronic dial 119 are rotating operation members capable of rotating clockwise and counterclockwise and, by being rotationally operated, enable various setting values such as the aperture and the shutter speed to be changed. A mode switching dial 109 is an operating portion for switching among photography modes. As an example, the mode switching dial 109 is used to switch among various modes such as a shutter speed priority photography mode, an aperture value priority photography mode, and a moving image photography mode. A SET button 110 is a push button mainly used to determine a selected item and the like.

A liquid crystal monitor 111 displays various setting screens of the camera 100, photographed images, and live view images. An electronic view finder 112 is a finder that can be used as an eyepiece and displays various setting screens of the camera 100, photographed images, and live view images. A multifunction button 113 is a push button that can be used by the user to optionally assign switching among various settings related to photography.

Figure 2:
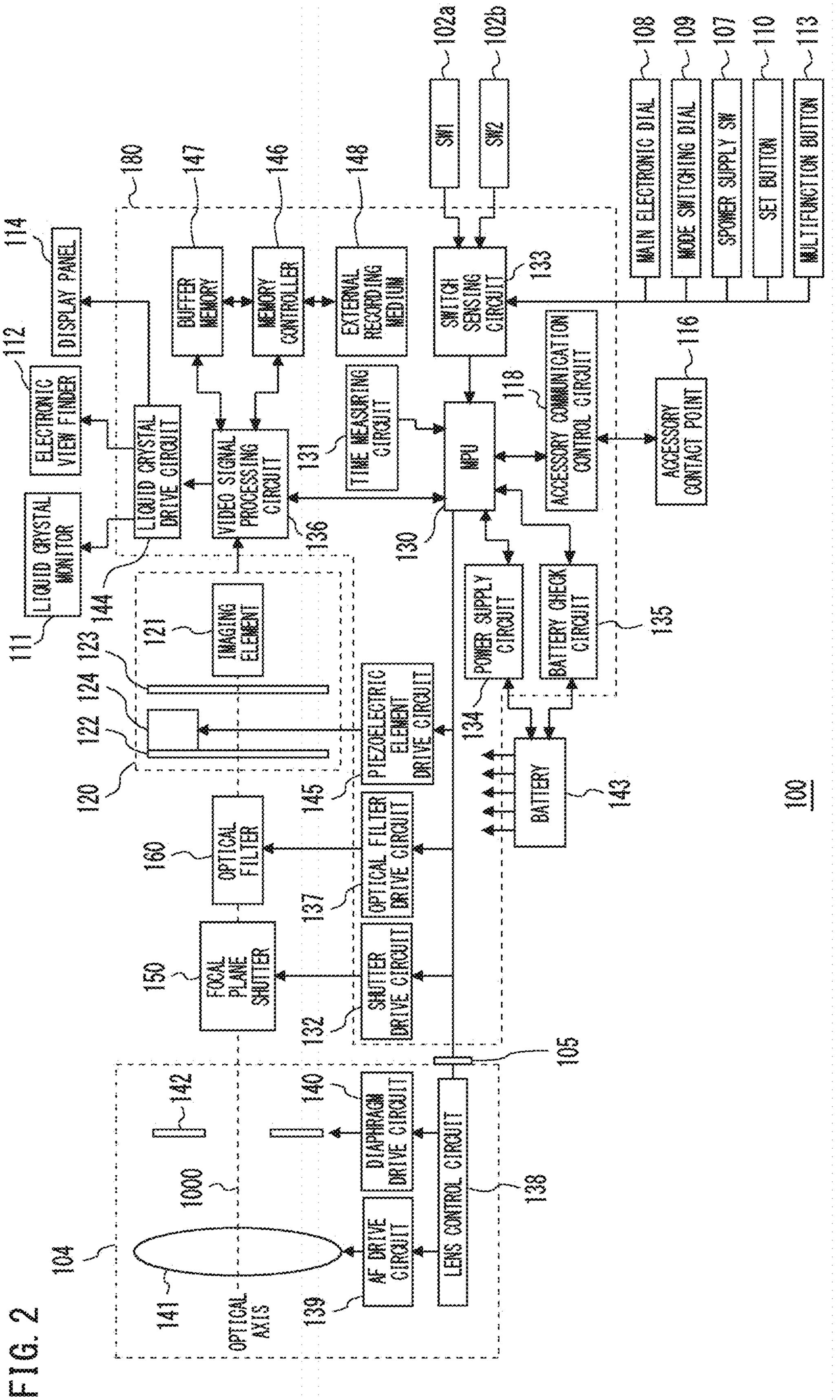
FIG. 2 is a block diagram showing an electrical configuration of the imaging apparatus according to the embodiment.
Figure 3:
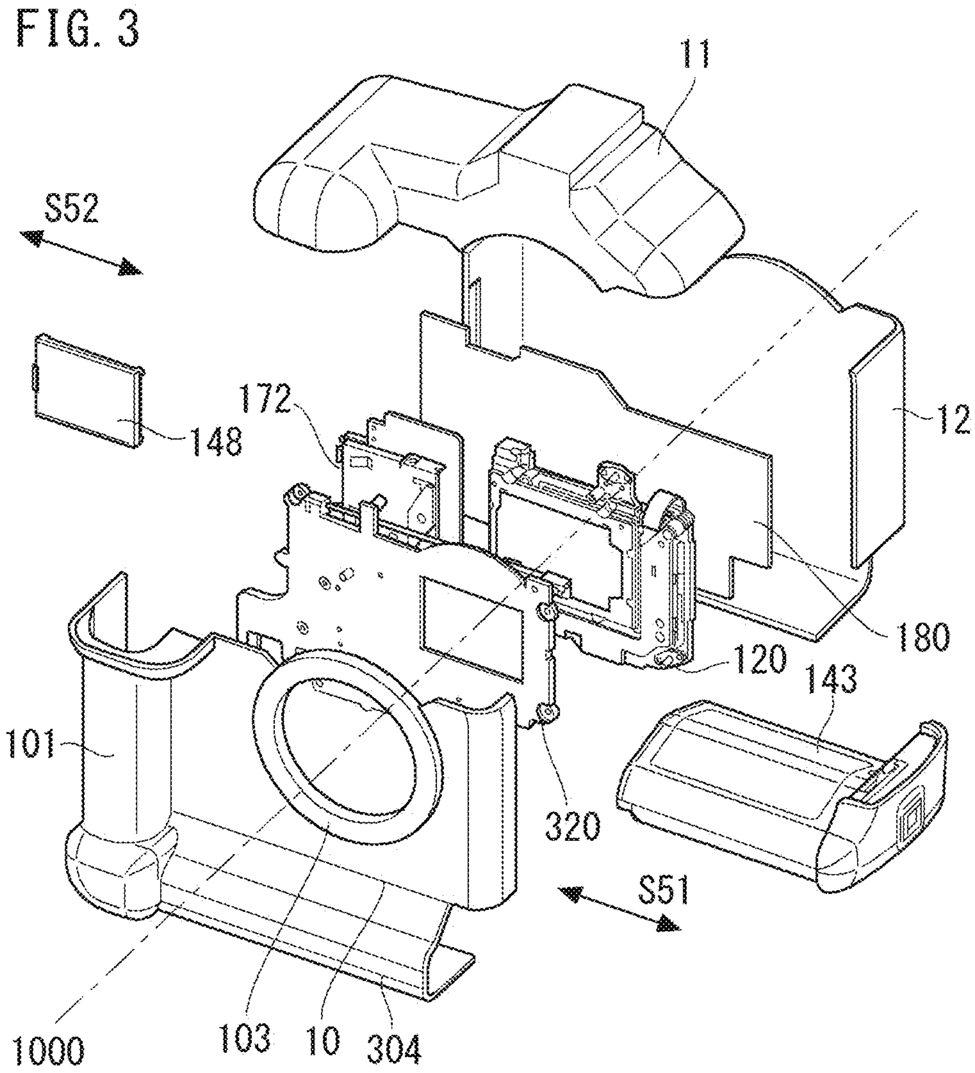
FIG. 3 is an exploded perspective view of the imaging apparatus according to the embodiment.

A display panel 114 displays various setting states of the camera such as photography modes and an ISO sensitivity. In addition, the display panel 114 is displayed even in a state where power of the camera has been turned off. An accessory shoe 115 includes an accessory contact point 116 (FIG. 2) and enables various accessories such as an external strobe light and an external microphone to be mounted thereto. A medium slot lid 173 can be opened and closed and, when opened, an external recording medium 148 (FIG. 3) can be inserted into and extracted from an internal medium slot 172 (FIG. 3). A battery 143 supplies power to the camera 100.

Next, an electrical configuration and operations of the camera 100 according to the present embodiment will be described with reference to FIG. 2. FIG. 2 is a block diagram showing a main electrical configuration of the camera 100.

An MPU (Micro Processing Unit) 130 is a small central arithmetic processing device that is built into the camera 100. An accessory communication control circuit 118, a time measuring circuit 131, a shutter drive circuit 132, a switch sensing circuit 133, and a power supply circuit 134 are connected to the MPU 130. In addition, a battery check circuit 135, a video signal processing circuit 136, an optical filter drive circuit 137, and a piezoelectric element drive circuit 145 are also connected to the MPU 130.

The MPU 130 performs operation control of the various portions of the camera 100, processes input information, and issues instructions and performs control with respect to various elements. The MPU 130 also includes an EEPROM (Electrically Erasable Programmable Read-Only Memory) and can store time information created by the time measuring circuit 131 and various pieces of setting information. In addition, the MPU 130 communicates with a lens control circuit 138 that is built into the photographic lens unit 104 via the mount contact point 105. Accordingly, the MPU 130 performs operation control of a focusing lens 141 and an electromagnetically-driven diaphragm 142 via an AF drive circuit 139 and a diaphragm drive circuit 140. Note that while only one focusing lens 141 is schematically shown in FIG. 2, the photographic lens unit 104 may be constituted of a group of a large number of lenses.

The AF drive circuit 139 has, for example, a stepping motor (not illustrated) connected thereto and drives the focusing lens 141. The MPU 130 calculates a focusing lens drive amount in accordance with a defocus amount detected using a focus signal read from an imaging element 121. In addition, the MPU 130 transmits a focus command including the calculated focusing lens drive amount to the lens control circuit 138.

The lens control circuit 138 having received the focus command controls driving of the focusing lens through the AF drive circuit 139. Accordingly, automatic focusing (AF) is performed. The diaphragm drive circuit 140 has a diaphragm actuator such as a stepping motor (not illustrated) connected thereto and drives a plurality of diaphragm blades (not illustrated) which form a diaphragm opening in the electromagnetically-driven diaphragm 142. In addition, when the plurality of diaphragm blades are driven, a size of the diaphragm opening changes and a light amount of the imaging luminous flux is adjusted.

The MPU 130 calculates a diaphragm drive amount from a brightness signal read from the imaging element 121 and transmits a diaphragm command including the calculated diaphragm drive amount to the lens control circuit 138. In other words, the MPU 130 performs communication for controlling the electromagnetically-driven diaphragm 142 with respect to the lens control circuit 138. The lens control circuit 138 having received the diaphragm command controls driving of the electromagnetically-driven diaphragm 142 through the diaphragm drive circuit 140. Accordingly, an appropriate aperture value is automatically set.

A mechanical focal plane shutter 150 is driven by the shutter drive circuit 132. During photography, by moving a front curtain shutter (not illustrated) and opening the shutter when a photographer depresses the shutter button 102 and moving a rear curtain shutter (not illustrated) and closing the shutter in accordance with a desired exposure time, the exposure time with respect to the imaging element 121 is controlled.

An optical filter 160 is an optical element which diffuses an imaging luminous flux incident to an imaging unit 120 of the camera 100 and which imparts a special effect to an image by attenuating light in a specific wavelength range. An ND (Neutral Density) filter which attenuates an incident light amount of the imaging luminous flux at a constant rate, a PL (Polarized Light) filter which suppresses reflected light using a polarizing film, a soft filter which diffuses light, or the like is used as the optical filter 160. A relative position of the optical filter 160 with respect to the imaging unit 120 is changed by driving the optical filter 160 with the optical filter drive circuit 137.

The imaging unit 120 is a unit which mainly integrates an optical low-pass filter 122, an optical low-pass filter holding member 123, a piezoelectric element 124 that is a piezoelectric member, and the imaging element 121. The imaging element 121 photoelectrically converts a subject image and, in the present embodiment, the imaging element 121 is assumed to be a CMOS (Complementary Metal Oxide Semiconductor) sensor. The imaging element 121 is not limited to a CMOS sensor and imaging devices of various forms such as a CCD type or a CID type may be adopted as the imaging element 121. The optical low-pass filter 122 arranged in a state preceding the imaging element 121 is a single rectangular birefringent plate made of quartz.

The piezoelectric element 124 is a single-plate piezoelectric element (piezo element) which is vibrated by the piezoelectric element drive circuit 145 under an instruction from the MPU 130 and which transmits the vibration to the optical low-pass filter 122. Due to the vibration of the piezoelectric element 124, fine dust adhered to the optical low-pass filter 122 can be shaken off.

The video signal processing circuit 136 is responsible for image processing in general including filter processing and data compression processing with respect to an electric signal obtained from the imaging element 121. Image data for monitor display from the video signal processing circuit 136 is displayed on the liquid crystal monitor 111 and the electronic view finder 112 via a liquid crystal drive circuit 144.

In addition, the video signal processing circuit 136 can also store image data in a buffer memory 147 through a memory controller 146 according to an instruction from the MPU 130. Furthermore, the video signal processing circuit 136 can also perform image data compression processing such as JPEG. When photography is continuously performed such as during consecutive photography, image data may be temporarily stored in the buffer memory 147 and pieces of unprocessed image data can be sequentially read through the memory controller 146. Accordingly, the video signal processing circuit 136 can sequentially perform image processing and compression processing regardless of an input rate of the image data.

The memory controller 146 includes a function of storing image data in the external recording medium 148 and a function of reading image data stored in the external recording medium 148. Examples of the external recording medium 148 include an SD card and a CF card which can be mounted to and removed from a camera main body.

The switch sensing circuit 133 transmits an input signal to the MPU 130 in accordance with an operation state of each switch. A switch SW1 (102*a*) is turned on by a first stroke (half-press) of the shutter button 102. A switch SW2 (102*b*) is turned on by a second stroke (full-press) of the shutter button 102. When the switch SW2 (102*b*) is turned on, an instruction to start photography is transmitted to the MPU 130. In addition, the main electronic dial 108, the mode switching dial 109, the power supply switch 107, the SET button 110, the multifunction button 113, and the like are connected to the switch sensing circuit 133.

The MPU 130 performs information communication with the accessory communication control circuit 118 in order to use functions of an accessory unit (not illustrated) via the accessory contact point 116. The power supply circuit 134 distributes and supplies power of the battery 143 to each element of the camera. In addition, the battery check circuit 135 is also connected to the battery 143 and conveys information on remaining battery life and the like of the battery 143 to the MPU 130.

Next, an internal configuration of the camera 100 according to the present embodiment will be described with reference to FIG. 3. FIG. 3 is an exploded perspective view of the camera 100 according to the present embodiment. An exterior of the camera 100 is mainly constituted of a front cover 10, a top cover 11, and a rear cover 12.

The battery 143 is arranged in a lower part of the camera 100 and can be inserted and extracted in a direction of an arrow S51. In addition, the external recording medium 148 can be inserted in a direction of an arrow S52 into the medium slot 172 provided in a side part of the camera 100. The medium slot 172 includes a push-type lever and the external recording medium 148 can be extracted in the direction of the arrow S52 by pushing the lever.

The lens mount portion 103 and the imaging unit 120 are provided on an optical axis 1000 of the camera 100 and an optical filter unit 320 is arranged between the lens mount portion 103 and the imaging unit 120. A main substrate on which the MPU 130 and the like are provided is arranged between the imaging unit 120 and the rear cover 12.

Figure 4:
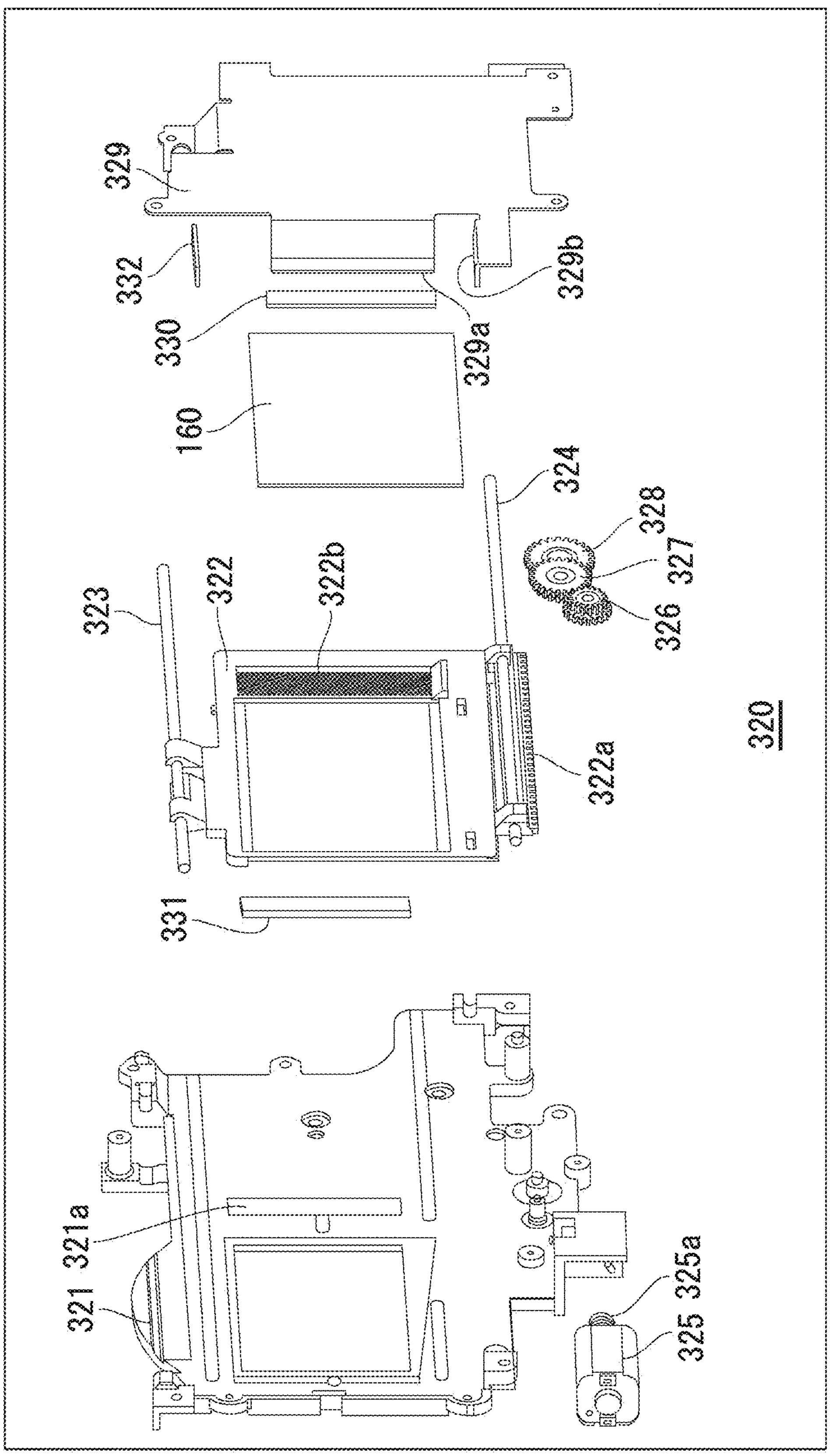
FIG. 4 is an exploded perspective view of an optical filter unit according to the embodiment.

Next, a configuration of the optical filter unit 320 will be described with reference to FIG. 4. FIG. 4 is an exploded perspective view of the optical filter unit 320 of the camera 100 according to the present embodiment.

Components that make up the optical filter unit 320 are mounted to a base member 321. The optical filter 160 is held by an optical filter holding member 322. The optical filter holding member 322 includes a rack gear 322*a*. The optical filter holding member 322 is engaged with an upper rail 323 and a lower rail 324 which are guiding members and is capable of moving the optical filter 160 in a direction in which the upper rail 323 and the lower rail 324 extend.

A leaf spring member 329 is mounted to the base member 321 by a screw (not illustrated). In addition, an elastic member 330 is fixed by a double-sided tape or the like to an affixing portion 329*a* of the leaf spring member 329. Furthermore, an accumulating member 332 is mounted in a mounting portion 329*b* of the leaf spring member 329. A clingy material such as a double-sided tape is preferably used as the accumulating member 332. An elastic member 331 is fixed to an affixing portion 321*a* of the base member 321 in a similar manner to the elastic member 330 and is arranged on an opposite side to the elastic member 330 with the optical filter 160 in-between. In addition, the elastic members 330 and 331 are arranged outside of a region where an imaging luminous flux passes through the optical filter 160.

Furthermore, the elastic members 330 and 331 are arranged so that sides opposite to an affixing surface come into contact with the optical filter 160 or rough surface portions 322*b* and 322*c* (FIG. 7C) of the optical filter holding member 322. In addition, surfaces of the rough surface portions 322*b* and 322*c* (FIG. 7C) of the optical filter holding member 322 are rougher than the surface of the optical filter 160 and are made of irregular surfaces as will be described later.

As shown in FIG. 4, a motor 325 for moving the optical filter holding member 322 with the rack gear 322*a* is arranged in the optical filter unit 320. A pinion gear 325*a* is mounted to a drive shaft of the motor 325. In addition, a first gear 326, a second gear 327, and a third gear 328 are rotatably mounted to shafts provided in the base member 321. The motor 325, the pinion gear 325*a*, the first gear 326, the second gear 327, the third gear 328, and the rack gear 322*a* function as actuators that move the optical filter holding member 322.

Figure 5A:
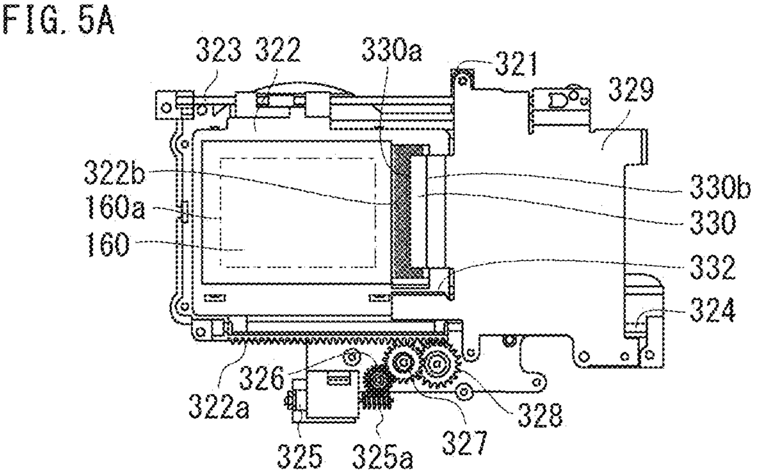
FIGS. 5A to 5C are diagrams for describing state transitions of the optical filter unit according to the embodiment.
Figure 5B:
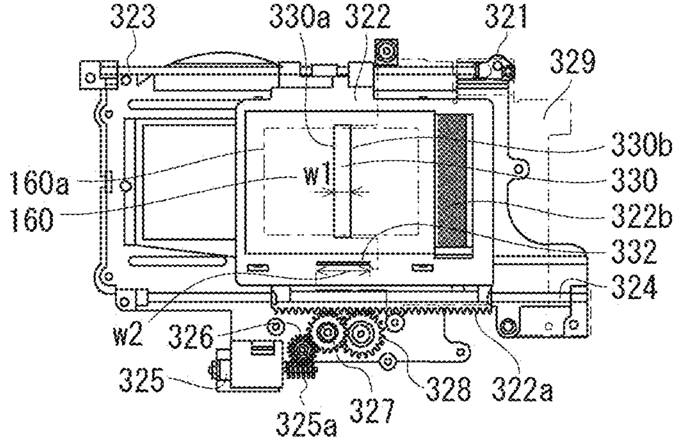
Figure 5C:
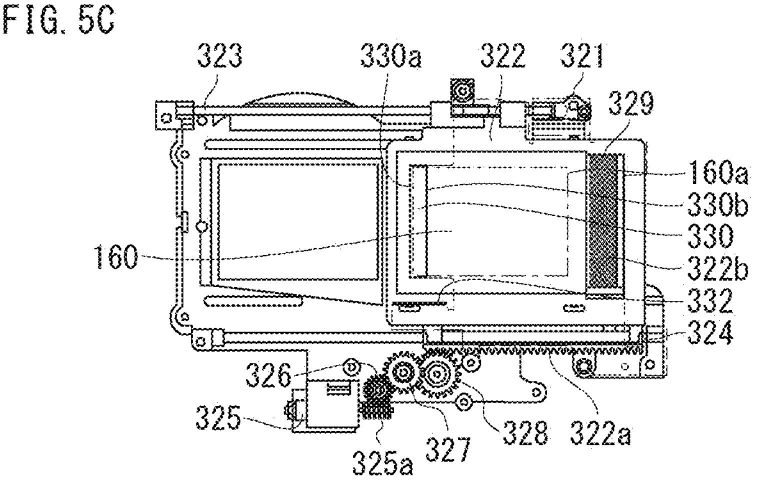

Next, a movement of the optical filter 160 held by the optical filter holding member 322 in the optical filter unit 320 will be described with reference to FIGS. 5A to 5C. FIG. 5A shows a state where the optical filter 160 is inserted into an imaging optical path. When the optical filter 160 is arranged as shown in FIG. 5A, an imaging luminous flux passes through the optical filter 160. FIG. 5B shows a state midway through a movement of the optical filter 160 from a state of being inserted into the imaging optical path to a state of being retreated from the imaging optical path. FIG. 5C shows a state where the optical filter 160 has retreated from the imaging optical path. When the optical filter 160 is arranged as shown in FIG. 5C, the imaging luminous flux does not pass through the optical filter 160. The optical filter holding member 322 is configured so as to be movable between a position shown in FIG. 5A and a position shown in FIG. 5B.

When the user depresses the multifunction button 113 in the insertion state shown in FIG. 5A, the optical filter holding member 322 starts to move to the state where the optical filter 160 has retreated from the imaging optical path. At this point, the rotation of the motor 325 is transmitted to the rack gear 322*a* of the optical filter holding member 322 via the first gear 326, the second gear 327, and the third gear 328.

In addition, the optical filter holding member 322 on which the optical filter 160 is arranged is guided by the upper rail 323 and the lower rail 324 and moves from the position (FIG. 5A) where the optical filter 160 is inserted into the imaging optical path to the position (FIG. 5C) where the optical filter 160 has retreated from the imaging optical path. When the optical filter 160 moves to the position where the optical filter 160 has retreated from the imaging optical path due to the movement of the optical filter holding member 322, a detection of the optical filter 160 by a sensor (not illustrated) causes the movements of the optical filter holding member 322 and the optical filter 160 to stop.

When the user inserts the optical filter 160 into the imaging optical path once again, the user depresses the multifunction button 113 in a state where the optical filter 160 is at the position shown in FIG. 5C. The motor 325 rotates in a direction opposite to that of the operation described above and the optical filter holding member 322 moves to the position shown in FIG. 5A. When the optical filter 160 moves to the position where the optical filter 160 is inserted into the imaging optical path, a detection of the optical filter 160 by a sensor (not illustrated) causes the movements of the optical filter holding member 322 and the optical filter 160 to stop.

Next, the elastic members 330 and 331 according to the present embodiment will be described. In FIGS. 5A to 5C, an effective area 160*a* enclosed by a dotted line of the optical filter 160 is a region where an imaging luminous flux guided from the focusing lens 141 (FIG. 2) passes through in the state shown in FIG. 5A where the optical filter 160 is inserted into the imaging optical path. Therefore, a region outside of the effective area 160*a* in the optical filter 160 is a region where the imaging luminous flux does not pass through in the state shown in FIG. 5A where the optical filter 160 is inserted into the imaging optical path.

First, a case where the optical filter 160 moves from the position (FIG. 5A: insertion state) where the optical filter 160 is inserted into the imaging optical path to the position (FIG. 5C: retreated state) where the optical filter 160 has retreated from the imaging optical path will be described. At the position (FIG. 5A) where the optical filter 160 is inserted into the imaging optical path, the elastic member 330 and the elastic member 331 are respectively in contact with the rough surface portion 322*b* and the rough surface portion 322*c* (FIGS. 7A to 7E) of the optical filter holding member 322.

During the movement of the optical filter holding member 322 from the position where the optical filter 160 is inserted into the imaging optical path to the position where the optical filter 160 has retreated from the imaging optical path, the elastic members 330 and 331 relatively move on the surface of the optical filter 160 while in contact with the surface of the optical filter 160. In addition, together with the movement of the optical filter holding member 322, a foreign object which is adhered to the surface of the optical filter 160 and which affects imaging is moved by the elastic members 330 and 331. In this case, the elastic members 330 and 331 come into contact with the effective area 160*a* of the optical filter 160 and moves the foreign object in the effective area 160*a* during the movement of the optical filter 160 from the insertion state (FIG. 5A) to the retreated state (FIG. 5C).

Figure 7A:
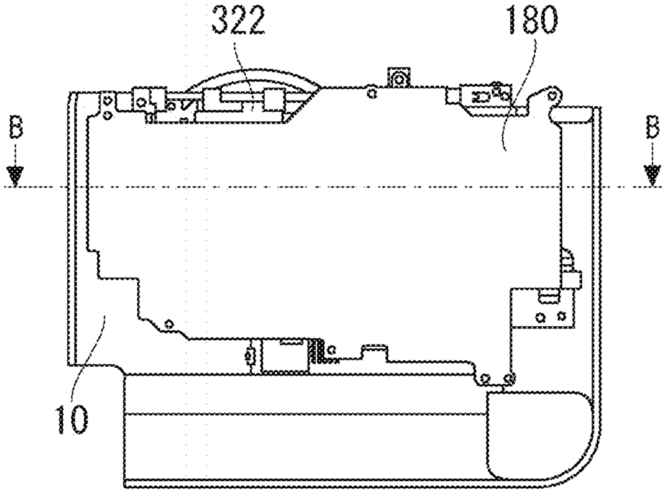
FIGS. 7A to 7E are diagrams showing a biasing relationship between an optical filter holding member and an elastic member according to the embodiment.
Figure 7B:
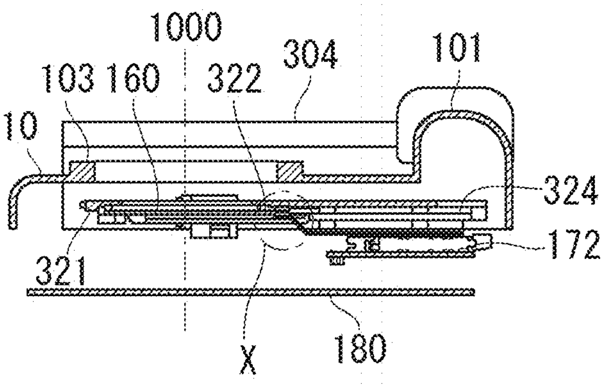
Figure 7C:
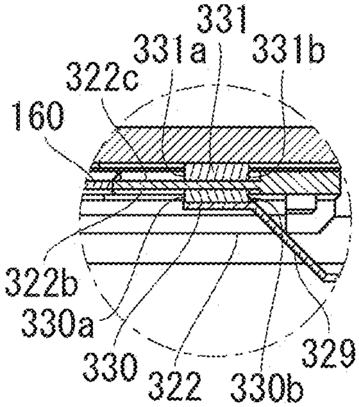
Figure 7D:
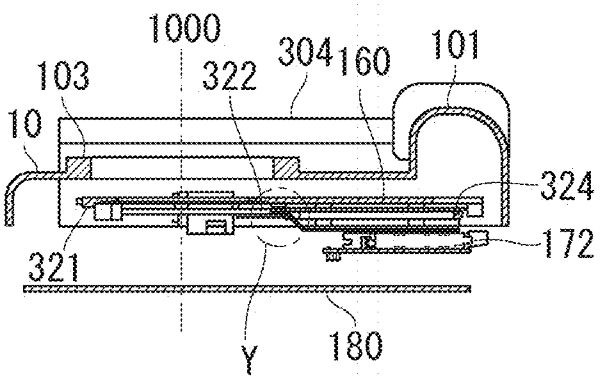
Figure 7E:
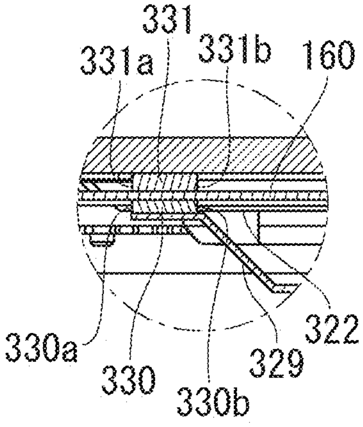

At this point, the foreign object adhered to the surface of the optical filter 160 is moved by adhering to an end 330*a* of the elastic member 330 and an end 331*a* of the elastic member 331 (FIG. 7E). In a state where the optical filter 160 has retreated from the imaging optical path shown in FIG. 5C, the end 330*a* of the elastic member 330 and the end 331*a* of the elastic member 331 are positioned outside of the effective area 160*a*. Therefore, the foreign object adhered to the end 330*a* of the elastic member 330 and the end 331*a* of the elastic member 331 can be moved outside of the effective area 160*a*.

Next, when the optical filter 160 moves from the retreated state (FIG. 5C) to the insertion state (FIG. 5A), the foreign object adhered to the optical filter 160 is similarly moved by adhering to an end 330*b* of the elastic member 330 and an end 331*b* of the elastic member 331 (FIG. 7E). In a state where the optical filter 160 is inserted into the imaging optical path shown in FIG. 5A, the elastic members 330 and

331 are respectively positioned in the rough surface portions 322*b* and 322*c* that are outside of the effective area 160*a*.

A behavior of a foreign object moved to the rough surface portion 322*b* by the elastic member 330 will now be described with reference to FIGS. 6A to 6D.

Figure 6B:
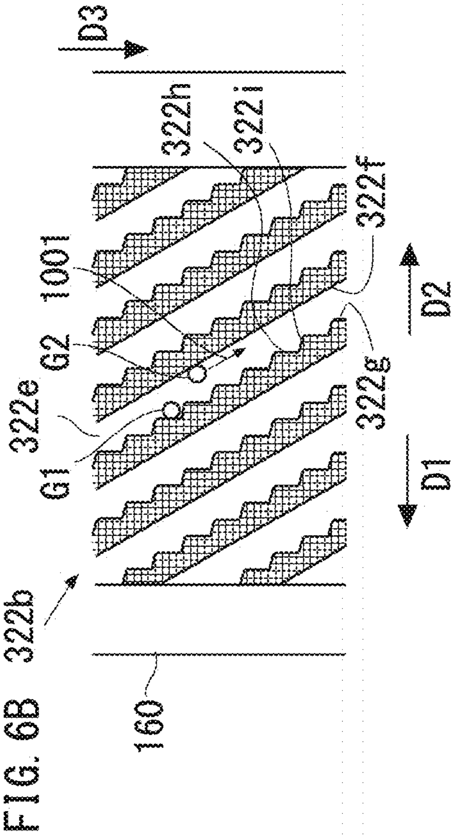
FIGS. 6A to 6D are diagrams for describing a behavior of a foreign object adhered to an optical filter according to the embodiment.
Figure 6D:
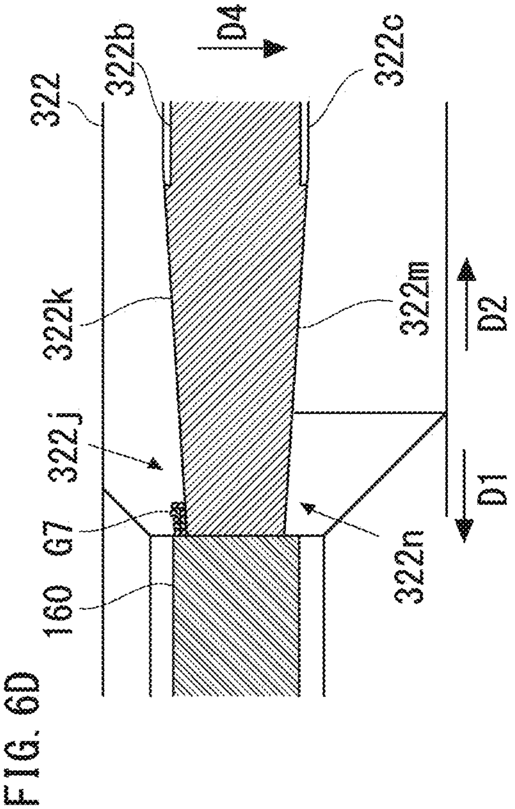
Figure 6A:
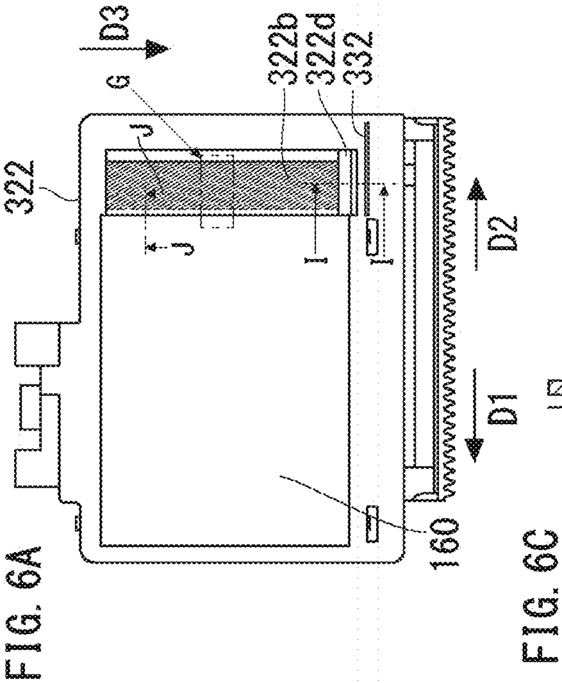
Figure 6C:
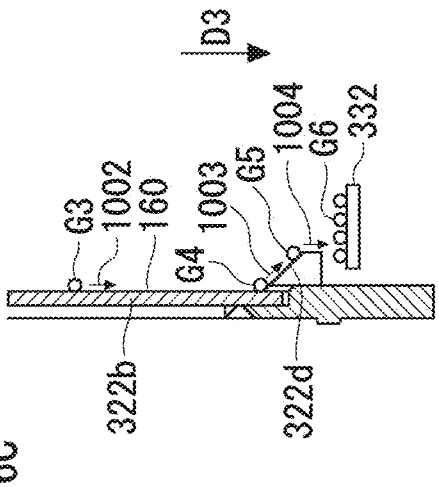

FIG. 6A is a diagram created by extracting the optical filter 160, the optical filter holding member 322, and the accumulating member 332 from the optical filter unit 320. FIG. 6B is an enlarged view of a rectangular portion denoted by G in FIG. 6A. FIG. 6C is an enlarged view of a cross section taken along line I-I in FIG. 6A. FIG. 6D is an enlarged view of a cross section taken along line J-J in FIG. 6A. In addition, in FIGS. 6A to 6D, a movement direction of the optical filter holding member 322 when the optical filter 160 moves from the retreated state (FIG. 5C) to the insertion state (FIG. 5A) is depicted by an arrow D1. Furthermore, a movement direction of the optical filter holding member 322 when the optical filter 160 moves from the insertion state (FIG. 5A) to the retreated state (FIG. 5C) is depicted by an arrow D2. Moreover, in FIGS. 6A to 6D, assuming a case where an imaging luminous flux passes through the optical filter 160 in a direction perpendicular to the direction of gravitational force, the direction of gravitational force at this point is depicted by an arrow D3.

When the optical filter 160 moves from the retreated state (FIG. 5C) to the insertion state (FIG. 5A), the optical filter holding member 322 moves in the direction depicted by the arrow D1. At this point, a foreign object adhered to the optical filter 160 is moved to the rough surface portion 322*b* of the optical filter holding member 322 that is outside of the optical filter 160.

In the present embodiment, as shown in FIG. 6B, an irregular surface is formed in the rough surface portion 322*b* of the optical filter holding member 322. In FIG. 6B, a hatching part with a grid pattern is a protrusion that protrudes further toward a near side in a direction of the paper plane than a portion without the hatching part. Furthermore, a plurality of grooves 322*e* are formed by protrusions and depressions (portions that are not hatching parts) in the rough surface portion 322*b*. Each groove 322*e* includes a wall portion 322*f* extending in a direction that obliquely intersects with the direction D2 on a far side (a side of the direction D2) from the optical filter 160. In addition, the groove 322*e* includes a saw-shaped wall portion 322*g* extending in the extending direction of the wall portion 322*f* on a near side (a side of the direction D1) to the optical filter 160. The wall portion 322*g* is formed so as to alternately connect a first portion 322*h* extending in the direction of gravitational force D3 that is perpendicular to the movement direction of the optical filter holding member 322 and a second portion 322*i* extending in a direction that intersects with the direction of gravitational force D3. In FIG. 6B, as an example, foreign objects accumulated on the end 330*b* of the elastic member 330 and moved to the rough surface portion 322*b* are depicted as foreign objects G1 and G2.

When the optical filter holding member 322 moves in the direction D1, the foreign object adhered to the elastic member 330 moves into the groove 322*e* in the rough surface portion 322*b* (foreign object G2). The elastic member 330 is in contact with the rough surface portion 322*b* and the foreign object G2 remains in contact with the elastic member 330 even after moving to the groove 322*e*. In addition, when the optical filter holding member 322 further moves in the direction of the arrow D1, the foreign object G2 is moved in the direction of the arrow D2 by the elastic member 330 and collides with the wall portion 322*f* of the groove 322*e*. Subsequently, the foreign object G2 moves in a direction of an arrow 1001 along the wall portion 322*f* with the movement of the optical filter holding member 322.

In addition, when the optical filter 160 moves from the insertion state (FIG. 5A) to the retreated state (FIG. 5C), the optical filter holding member 322 moves in the direction depicted by the arrow D2. At this point, the foreign object G1 adhered to the elastic member 330 is moved in the direction of the arrow D1 by the elastic member 330 and collides with the first portion 322*h* of the wall portion 322*g* of the groove 322*e*. Alternatively, the foreign object G1 is moved in the direction of the arrow D1 by the elastic member 330, collides with the second portion 322*i*, and moved along the second portion 322*i* to the first portion 322*h*. Since the first portion 322*h* is a wall portion extending in the direction of gravitational force D3 or, in other words, a direction perpendicular to the movement direction D2 of the optical filter holding member 322, the foreign object G1 remains in contact with the first portion 322*h* and does not move even when the optical filter holding member 322 moves. Therefore, the foreign object G1 remains in the rough surface portion 322*b* and is prevented from returning to the optical filter 160. As described above, according to the present embodiment, a foreign object of the optical filter 160 which is adhered to the elastic member 330 is moved to the groove 322*e* formed in the rough surface portion 322*b* of the optical filter holding member 322 and a phenomenon in which the foreign object returns from the groove 322*e* to the optical filter 160 is suppressed.

Next, a movement of the foreign object G2 shown in FIG. 6B will now be described with reference to the sectional view in FIG. 6C. In FIG. 6C, moved positions of the foreign object G2 shown in FIG. 6B are denoted by G3, G4, G5, and G6. As shown in FIG. 6C, the accumulating member 332 for accumulating foreign objects of the optical filter 160 having been moved by the elastic member 330 is provided on a side of a direction perpendicular to the movement direction of the optical filter holding member 322 or, in other words, a side of the direction of gravitational force D3 with respect to the rough surface portion 322*b*.

When the optical filter holding member 322 is repetitively moved between the insertion state and the retreated state of the optical filter 160, in FIG. 6C, the foreign object G2 moves in a direction of an arrow 1002 along the wall portion 322*f* from the position G3. In addition, the foreign object G2 reaches the position G4 at an upper end of an inclined portion 322*d* of the optical filter holding member 322. The foreign object G2 having moved to the position G4 moves in a direction of an arrow 1003 along an inclined surface of the inclined portion 322*d* and reaches the position G5 at a lower end of the inclined portion 322*d*. The foreign object G2 having moved to the position G5 moves in a direction of an arrow 1004 from the inclined portion 322*d* and is accumulated on a surface of the accumulating member 332 (position G6).

As described above, according to the present embodiment, a foreign object adhered to the optical filter 160 is moved into the groove 322*e* of the rough surface portion 322*b* by the elastic member 330 and subsequently accumulated by the accumulating member 332. In addition, as shown in FIG. 5B, a width w2 of the accumulating member 332 is set larger than a width w1 of the elastic member 330 in the movement direction of the optical filter holding member 322. Accordingly, even when a foreign object adhered to the ends 330*a* and 330*b* of the elastic member 330 drops from the elastic member 330 during a movement of the optical filter holding member 322, the foreign object can be caught by the accumulating member 332. Note that an inclined portion and an accumulating member similar to the inclined portion 322*d* and the accumulating member 332 described above are also provided on an opposite side with the optical filter holding member 322 in-between. Accordingly, a foreign object moved to the rough surface portion 322*c* is accumulated by the accumulating member from the rough surface portion 322*c* via the inclined portion in a similar manner to a foreign object moved to the rough surface portion 322*b*.

In addition, as shown in FIG. 6D, in the optical filter holding member 322, depressions 322*j* and 322*n* are formed between the optical filter 160 and the rough surface portions 322*b* and 322*c*. Furthermore, the depressions 322*j* and 322*n* have inclined surfaces 322*k* and 322*m* that rise toward the rough surface portions 322*b* and 322*c* from the optical filter 160.

Hereinafter, while a description will be given with a focus on a relationship among the optical filter 160, the rough surface portion 322*b*, the inclined surface 322*k*, the depression 322*j*, and a foreign object, a relationship among the optical filter 160, the rough surface portion 322*c*, the inclined surface 322*m*, the depression 322*n*, and a foreign object can also be described in a similar manner. In FIG. 6D, a direction in which an imaging luminous flux passes through the optical filter 160 is denoted by a direction D4. As shown in FIG. 6D, the inclined surface 322*k* is formed in the depression 322*j* that is depressed in the direction D4 with respect to the surface of the optical filter 160.

When the optical filter 160 moves from the insertion state (FIG. 5A) to the retreated state (FIG. 5C), a foreign object having been moved into the groove 322*e* of the rough surface portion 322*b* may move outside of the groove 322*e* while remaining adhered to the elastic member 330 and may move to the side of the optical filter 160. In this case, as shown in FIG. 6D, the foreign object having been moved outside of the groove 322*e* moves in the direction of the arrow D1 along the inclined surface 322*k* and accumulates inside of the depression 322*j* as depicted by a foreign object G7. As shown in FIG. 6D, on a cross section of the optical filter holding member 322 made of a surface parallel to the direction of the arrow D4, the depression 322*j* is formed to be lower than the surface of the optical filter 160 and the surface of the rough surface portion 322*b*. Therefore, in the present embodiment, by causing a foreign object having been moved to the rough surface portion 322*b* by the elastic member 330 to be accumulated inside of the depression 322*j*, the foreign object can be prevented from returning once again to the optical filter 160.

A phenomenon of a foreign object having been moved outside of the groove 322*e* returning to the optical filter 160 can be more suppressed when widths of the inclined surfaces 322*k* and 322*m* in the movement direction of the optical filter holding member 322 are wider. In addition, a foreign object is more readily moved to the rough surface portions 322*b* and 322*c* by the elastic members 330 and 331 when the inclined surfaces 322*k* and 322*m* are more gradual or, in other words, when gradients of the inclined surfaces 322*k* and 322*m* are smaller. Ranges in which the depressions 322*j* and 322*n* are formed and widths and gradients of the inclined surfaces 322*k* and 322*m* in the optical filter holding member 322 may be appropriately determined according to sizes of the optical filter holding member 322 and the optical filter 160 that are built into the camera 100 and according to an arrangement of components of various parts.

While the behavior of a foreign object on the side of the elastic member 330 has been described above with reference to FIGS. 6A to 6D, the optical filter holding member 322 includes constituent elements similar to those described above in the elastic member 331 provided on an opposite side with the optical filter 160 in-between. Therefore, a foreign object of the optical filter 160 adhered to the elastic member 331 exhibits similar behavior to that described above.

Next, a biasing relationship among the optical filter 160, the optical filter holding member 322, and the elastic members 330 and 331 will be described with reference to FIGS. 7A to 7E. FIG. 7A is a view of the camera 100 as seen from a rear side in a state where the rear cover 12 has been removed.

FIG. 7B is a sectional view taken along line B-B in FIG. 7A in the insertion state (FIG. 5A) of the optical filter 160. FIG. 7C is an enlarged view of a portion enclosed by a circle denoted by X in FIG. 7B for the purpose of illustration. FIG. 7D is a sectional view taken along line B-B in FIG. 7A in the retreated state (FIG. 5C) of the optical filter 160. FIG. 7E is an enlarged view of a portion enclosed by a circle denoted by Y in FIG. 7D for the purpose of illustration.

As shown in FIGS. 7B and 7C, when the optical filter 160 is in the insertion state, the elastic members 330 and 331 are respectively in contact with the rough surface portions 322*b* and 322*c* of the optical filter holding member 322. The leaf spring member 329 biases the elastic member 330 in the direction of the optical filter holding member 322. In addition, due to the optical filter holding member 322 pushing back the elastic member 331 in the direction of the leaf spring member 329 against a biasing force of the leaf spring member 329, equilibrium is established between the elastic members 330 and 331.

As shown in FIG. 7D, when the optical filter 160 is in the retreated state, the optical filter 160 is caused to retreat to a position between the grip portion 101 and the medium slot 172 or a main substrate 180 by the optical filter holding member 322. In addition, as shown in FIGS. 7D and 7E, when the optical filter 160 is in the retreated state, the elastic members 330 and 331 are in contact with the optical filter 160. The leaf spring member 329 biases the elastic member 330 in the direction of the optical filter holding member 322. In addition, due to the optical filter holding member 322 pushing back the elastic member 331 in the direction of the leaf spring member 329 against the biasing force of the leaf spring member 329, equilibrium is established between the elastic members 330 and 331.

In this case, sounds and vibrations that occur when the optical filter holding member 322 moves such as motor sounds and minute vibrations due to meshing of the gears are transmitted to the elastic members 330 and 331 by the optical filter 160 or the optical filter holding member 322 and absorbed by the elastic members 330 and 331. Therefore, the vibrations and the sounds that occur when the optical filter holding member 322 moves are hardly transmitted to the user using the camera 100.

As described above, according to the present embodiment, the camera 100 which has a built-in optical filter and which is capable of more suitably removing a foreign object adhered to the optical filter 160 can be provided without having to enlarge a conventional interchangeable lens camera.

Figure 8:
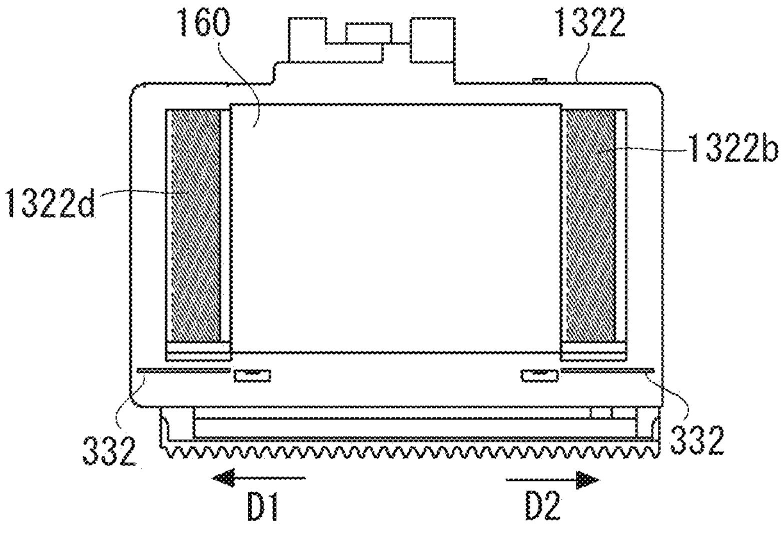
FIG. 8 is a diagram showing a configuration of an optical filter holding member according to a modification.
Figure 9:
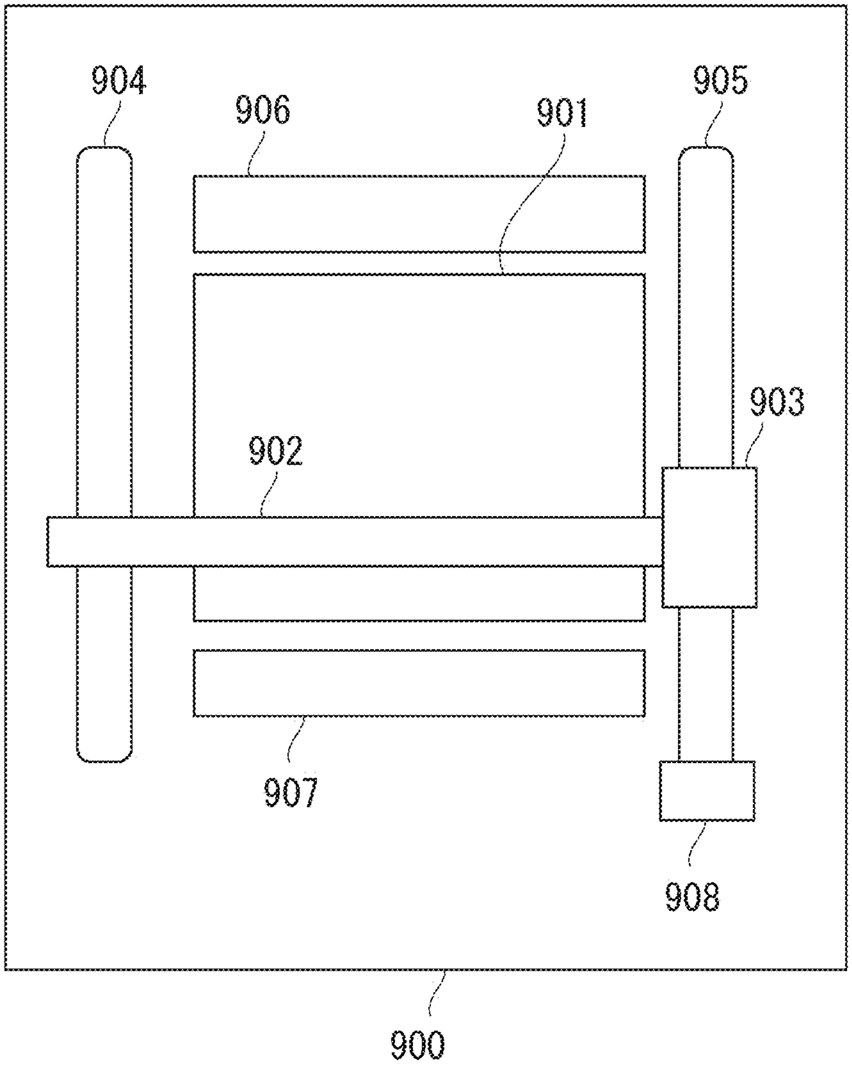
FIG. 9 is a diagram showing a schematic configuration of a foreign object removal apparatus according to conventional art.

Next, a modification of the embodiment described above will be described with reference to FIG. 8. It should be noted that, in the following description, components similar to those of the camera 100 according to the embodiment described above will be denoted by the same reference signs and illustrations and detailed descriptions thereof will be omitted and components that differ from the embodiment described above will be described. FIG. 8 is a diagram showing an optical filter holding member 1322 built into the camera 100 according to the present modification. FIG. 8 is a view which corresponds to FIG. 6A and which is created by extracting the optical filter 160, the optical filter holding member 1322, and the accumulating member 332 from the optical filter unit 320.

Due to a movement of the optical filter holding member 1322 in a direction of an arrow D1, the optical filter 160 is moved from a position where the optical filter 160 is retreated from an imaging optical path to a position where the optical filter 160 is inserted into the imaging optical path. In addition, due to a movement of the optical filter holding member 1322 in a direction of an arrow D2, the optical filter 160 is moved from the position where the optical filter 160 is inserted into the imaging optical path to the position where the optical filter 160 is retreated from the imaging optical path. Furthermore, in the optical filter holding member 1322, rough surface portions 1322*d* and 1322*b* are respectively arranged on a side of the direction D1 and a side of the direction D2 with respect to the optical filter 160. Note that in the optical filter holding member 1322, rough surface portions configured in a similar manner to the rough surface portions 1322*b* and 1322*d* are respectively arranged on opposite sides to the rough surface portions 1322*b* and 1322*d* with the optical filter holding member 1322 in-between.

In the present modification, when the optical filter 160 is in the insertion state, the elastic member 330 is at a position where the elastic member 330 comes into contact with the rough surface portion 1322*d*. In addition, when the optical filter 160 moves from the insertion state to the retreated state, the optical filter holding member 1322 moves in the direction depicted by the arrow D2. At this point, the elastic member 330 relatively moves on the surface of the optical filter 160 from the rough surface portion 1322*d* with the movement of the optical filter holding member 1322 and, when the optical filter 160 assumes the retreated state, moves to a position where the elastic member 330 comes into contact with the rough surface portion 1322*b*. Therefore, when the optical filter 160 moves from the insertion state to the retreated state, a foreign object on the surface of the optical filter 160 adheres to the elastic member 330 and is moved to the rough surface portion 1322*b*.

On the other hand, when the optical filter 160 moves from the retreated state to the insertion state, the optical filter holding member 1322 moves in the direction depicted by the arrow D1. At this point, the elastic member 330 relatively moves on the surface of the optical filter 160 from the rough surface portion 1322*b* with the movement of the optical filter holding member 1322 and, when the optical filter 160 assumes the insertion state, moves to a position where the elastic member 330 comes into contact with the rough surface portion 1322*d*. Therefore, when the optical filter 160 moves from the retreated state to the insertion state, a foreign object on the surface of the optical filter 160 adheres to the elastic member 330 and is moved to the rough surface portion 1322*d*.

Since behaviors of foreign objects having been moved to the rough surface portions 1322*b* and 1322*d* are similar to the embodiment described above, a detailed description will be omitted. In addition, the elastic member 331 is arranged on an opposite side to the elastic member 330 with the optical filter 160 in-between. Since movements of the elastic member 331 and behaviors of a foreign object are similar to the case of the elastic member 330, a detailed description will be omitted.

Therefore, according to the present modification, since a foreign object of the optical filter 160 moves to the rough surface portions 1322*b* and 1322*d* every time the optical filter 160 is switched between the insertion state and the retreated state, an effect of more reliably removing a foreign object of the optical filter 160 can be expected.

According to the present invention, in an imaging apparatus with a built-in optical filter, a foreign object adhered to the optical filter can be more suitably removed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-120478, filed on Jul. 25, 2023, which is hereby incorporated by reference herein in its entirety.

What is claimed is:

1. An imaging apparatus, comprising:

an optical filter;

a holding member which holds the optical filter and which is movable between a first position where an imaging luminous flux passes through the optical filter and a second position where the imaging luminous flux does not pass through the optical filter; and an elastic member which relatively moves on a surface of the optical filter while being in contact with the surface during a movement of the holding member, wherein a portion, on a surface of the holding member, where the elastic member comes into contact with when the holding portion is at the first position or the second position is rougher than the surface of the optical filter.

2. The imaging apparatus according to claim 1, wherein in the holding member, a depression is formed in a direction in which the imaging luminous flux passes through the optical filter with respect to the surface of the optical filter between the optical filter and the portion where the elastic member comes into contact with.

3. The imaging apparatus according to claim 2, wherein the depression includes an inclined surface which rises toward the portion where the elastic member comes into contact with from the optical filter.

4. The imaging apparatus according to claim 1, wherein irregularities are formed in the portion where the elastic member comes into contact with.

5. The imaging apparatus according to claim 4, wherein a groove due to the irregularities is formed in the portion where the elastic member comes into contact with, and in the groove, a wall portion on a far side from the optical filter extends in a direction that obliquely intersects with a movement direction of the holding member and a wall portion on a near side to the optical filter extends in a direction that is perpendicular to the movement direction of the holding member.

6. The imaging apparatus according to claim 1, wherein an accumulating member which accumulates foreign objects which are adhered to the surface of the optical filter and which have been moved to the portion where the elastic member comes into contact with by the elastic member is provided on a side of a direction perpendicular to a movement direction of the holding member between the first position and the second position with respect to the portion where the elastic member comes into contact with.

7. The imaging apparatus according to claim 6, wherein a width of the accumulating member is greater than a width of the elastic member in the movement direction of the holding member between the first position and the second position.

8. The imaging apparatus according to claim 1, wherein the elastic member is arranged outside of a region where the imaging luminous flux passes through the optical filter.

* * * * *